(12) United States Patent
Beebe et al.

(10) Patent No.: US 6,821,475 B2
(45) Date of Patent: Nov. 23, 2004

(54) METHOD OF FABRICATING A MICROSTRUCTURE

(75) Inventors: David J. Beebe, Madison, WI (US); Joseph M. Bauer, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 10/125,498

(22) Filed: Apr. 17, 2002

(65) Prior Publication Data

US 2002/0170668 A1 Nov. 21, 2002

Related U.S. Application Data

(60) Provisional application No. 60/284,378, filed on Apr. 17, 2001.

(51) Int. Cl.[7] .............................................. B29C 39/02
(52) U.S. Cl. ....................... 264/496; 264/494; 264/250; 264/293; 264/299; 264/313; 264/DIG. 44
(58) Field of Search ................................. 264/494, 496, 264/250, 266, 293, 296, 299, 313, 337–339, DIG. 44, 259, 295; 425/112, 117, 465, 466, DIG. 12, 116

(56) References Cited

U.S. PATENT DOCUMENTS

| | | | | |
|---|---|---|---|---|
| 5,073,237 A | * | 12/1991 | Bacher et al. | ............... 264/320 |
| 5,094,796 A | * | 3/1992 | Katoh et al. | ................. 264/313 |
| 5,256,360 A | | 10/1993 | Li | ............................... 264/219 |
| 5,676,983 A | | 10/1997 | Bacher et al. | ............... 425/385 |
| 5,795,519 A | | 8/1998 | Bacher et al. | ............... 264/139 |
| 6,332,736 B1 | * | 12/2001 | Cape et al. | .................... 404/75 |

* cited by examiner

Primary Examiner—Angela Ortiz
(74) Attorney, Agent, or Firm—Boyle Fredrickson Newholm Stein & Gratz S.C.

(57) ABSTRACT

A method of fabricating a microstructure is provided. The method includes the step of providing a layer of a polymerizable material. A solid is brought into contact with the layer of polymerizable material so as to alter the shape of the upper surface of the layer. Thereafter, the layer of polymerizable material is polymerized such that the layer solidifies and the upper surface thereof assumes a desired three-dimensional configuration.

21 Claims, 3 Drawing Sheets

METHOD OF FABRICATING A MICROSTRUCTURE

CROSS-REFERENCE TO RELATED APPLICATIONS

This application claims the benefit of U.S. Provisional Application Ser. No. 60/284,378, filed Apr. 17, 2001.

FIELD OF THE INVENTION

This invention relates generally to microfluidic devices, and in particular, to a method of fabricating three-dimensional microstructures.

BACKGROUND AND SUMMARY OF THE INVENTION

As is known, microfluidic devices are being used in an increasing number of applications. However, further expansion of the uses for such microfluidic devices has been limited due to the difficulty and expense of fabrication. In order to more efficiently fabricate these devices, various methods of manufacture have been borrowed from the integrated circuit industry. These methods have led to the development of two-dimensional or pseudo three-dimensional (orthogonal) microscale structures. Unfortunately, present methods to construct non-orthogonal shapes (smooth curves, etc.) at the microscale level are limited. Curved microstructures are highly desirable since such structures have different stress distributions upon mechanical loading than orthogonal structures. Further, microstructures having curved sidewalls allow for different flow patterns through the channels of a microfluidic device, as compared to orthogonal geometries, thereby providing more efficient mixing designs and more lifelike environments for biological studies.

Traditional methods of fabricating microelectromechanical systems (MEMS) involve the creation of three-dimensional structures by forming layers on top of one another or by etching a bulk substrate. The sidewalls of the individual layers of the structures can be vertical, angled or curved depending on the process used to create the layer. For example, vertical sidewalls can be formed in a layer by the rapid ion etching (RIE) of the layer. Angled sidewalls can be formed by chemically etching a layer along a crystal plane. Curved sidewalls can be created by the diffusion-limited chemical etching of a layer. Although a variety of sidewall shapes are possible with these prior methods, control over the shapes of the sidewall is limited by the angle of the crystal plane or the physics of the chemical or ion etch. Vertical structures can also be achieved by electroplating. However, microscale electroplating is relatively expensive, time consuming and difficult to control. Three-dimensional structures of arbitrary shape have been demonstrated with two-photon polymerization, but the process requires expensive equipment and is slow, as the geometry must be "written" piece by piece. In view of the foregoing, it can be appreciated that a method of farbrication that allows for the rapid construction of smooth three-dimensional microstructure geometries would be a significant advancement in the art.

Therefore, it is a primary object and feature of the present invention to provide a method of fabricating a microstructure that is simple and inexpensive.

It is a further object and feature of the present invention to provide method of fabricating a microstructure that allows for the rapid construction of smooth three-dimensional microstructure geometries.

It is a still further object and feature of the present invention to provide a method of fabricating a microstructure that facilitates the speedy manufacture of such devices.

In accordance with the present invention, a method is provided for fabricating a microstructure. The method includes the steps of providing a layer of polymerizable material and bringing a solid into contact with the layer. The layer of polymerizable material is polymerized such that the layer solidifies. The solid may be disengaged from the layer after the layer is polymerized or moved during the step of polymerizing the layer. Alternatively, the solid may be dissolved after the layer is polymerized. The solid may be hydrophilic or hydrophobic. It is understood that the term "hydrophilic" as used herein shall mean any material that has a strong affinity or preference for the polymerizable material. The term "hydrophobic" shall mean any material that has a lack of affinity for or an aversion to the polymerizable material.

It is contemplated to position the layer in a gas such that the layer and the gas intersect at an interface that has a generally curved shape adjacent to the solid. The solid may be moved into the layer of polymerizable material prior to the step of polymerizing the layer or drawn away from the layer of polymerizable material prior to the step of polymerizing the layer so as to form the curved shape of the interface.

In accordance with the further aspect of the present invention, a method is provided of forming a microstructure. The method includes the step of providing a layer of polymerizable material having an upper surface. The upper surface of the polymerizable material has a shape, and is engaged with a solid object so as to alter the shape thereof. Thereafter, the layer is solidified by polymerization.

The solid object may be disengaged from the layer after the layer is polymerized or moved during the step of polymerizing the layer. It is contemplated to move at least a portion of the solid object into the layer prior to the step of polymerizing the layer. Thereafter, the portion of the solid object in the layer may be moved towards the upper surface of the layer prior to the step of polymerizing the layer. Alternatively, a portion of the solid object may engage the upper surface of the layer. The portion of the solid object that engages the upper surface is dissolved after the layer is polymerized.

In accordance with a further aspect of the present invention, a method of forming a microstructure is provided. The method includes the step of depositing a polymerizable material on a base layer. The polymerizable material has an interface with a fluid. The interface is manipulated with a solid object to a user desired shape. Thereafter, the polymerizable material is polymerized such that the interface retains a shape corresponding to the user desired shape.

In order to manipulate the interface, the interface is engaged by the solid object. The solid object is moved into contact with the interface, and thereafter, drawn away from the base layer. The solid object is maintained at a predetermined position while the polymerizable material is polymerized. The polymerizable material is polymerized by directing a polymerizing agent towards the polymerizable material.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
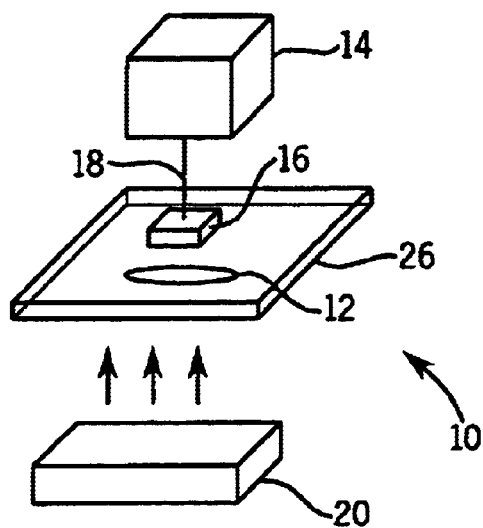
FIG. 1 is an isometric view of a device for implementing the method of the present invention.

Referring to FIG. 1, a device for implementing the method of the present invention is generally designated by the reference numeral 10. It is intended that device 10 be used to form curved, three-dimensional microstructures by solidifying polymerizable material 12. Device 10 includes a xyz manipulator 14 operatively connected to a solid object 16 by a shaft 18 such that xyz manipulator 14 positions solid object 16 at a predetermined location, for reasons hereinafter described. Device 10 further includes source 20 that generates a polymerizing agent for polymerizing polymerizable material 12. By way of example, source 20 may take the form of a UV light source for generating ultraviolet light. Alternatively, source 20 may generate other types of polymerizing agents such heat, cold, other radiation sources or the like.

Figure 2:
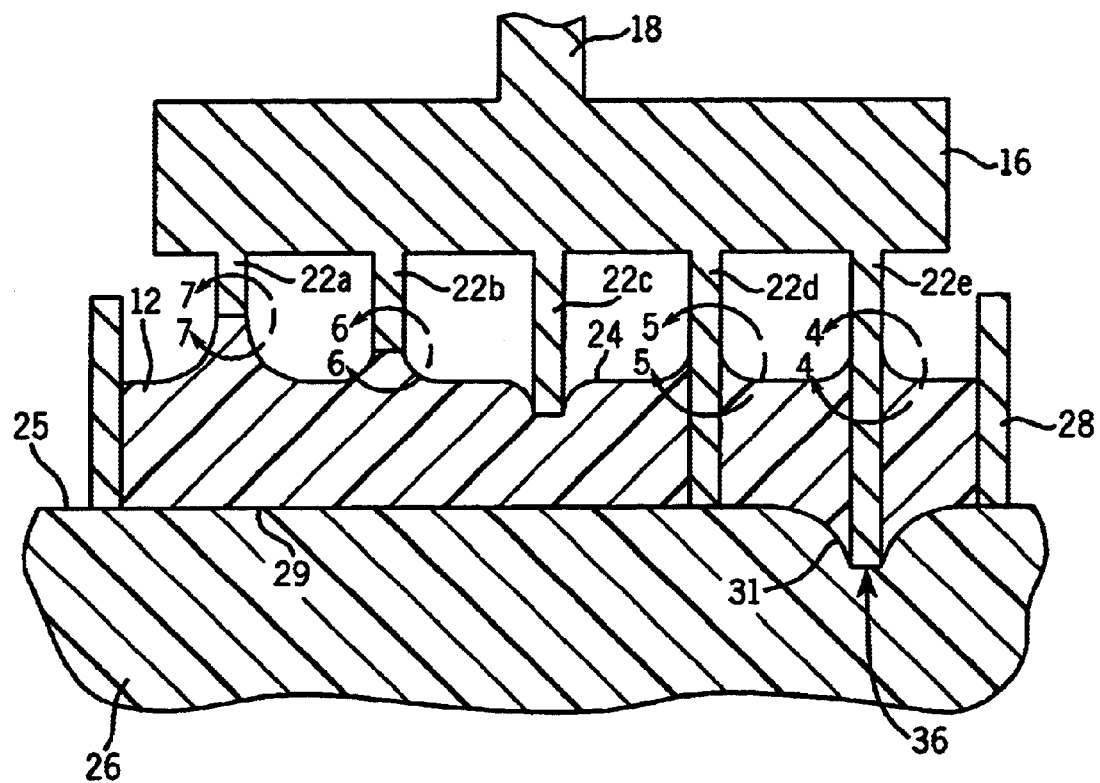
FIG. 2 is an enlarged, cross sectional view showing an operational step of the method of the present invention.
Figure 3:
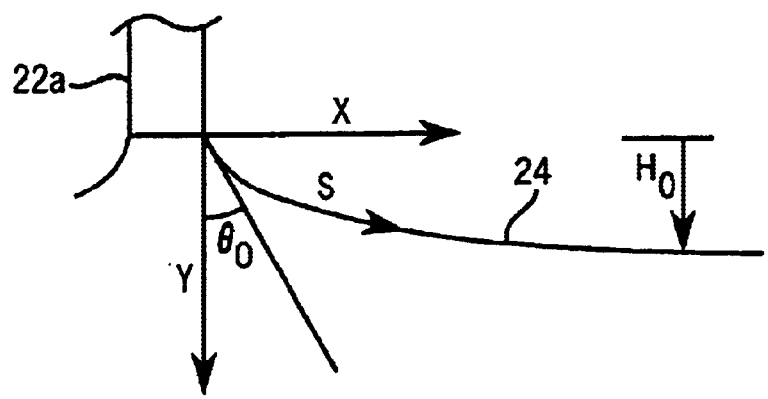
FIG. 3 is a schematic view of the fluid/ambient air interface provided during execution of the method of the present invention.

Referring to FIGS. 2–3, solid object 16 includes a plurality of independently positionable legs 22a–22e. It is intended that legs 22a–22e of solid object 16 be brought into contact with polymerizable material 12 as hereinafter described. As is known, when an object, such as one of legs 22a–22e, is brought into contact with a gas/liquid or liquid/liquid interface, and thereafter, moved either into the liquid or pulled away from the interface, the interface assumes a smooth, curved-shape or meniscus. The shape of the meniscus can be varied by controlling certain parameters. By way of example, the shape of the meniscus can be varied by engaging the interface with a different object, by varying the position of the object after engagement with the interface, by varying the interfacial surface tension of the polymerizable material or by varying the density of the polymerizable material. For a one-dimensional gas/liquid interface having an arbitrarily curved interface with one principal radius of curvature $R_1$, the pressure increase $\Delta P$ on the concave side of the interface is given by the Young-LaPlace equation:

$$\Delta P = \gamma(1/R_1 + 1/R_2) \qquad \text{Equation 1}$$

wherein $\gamma$ is the interfacial surface tension; and $R_2 = \infty$.

The hydrostatic pressure difference between the two fluids (or a liquid and a gas) may be calculated according to the expression:

$$\Delta P = \Delta\rho g(H_0 - Y) \qquad \text{Equation 2}$$

wherein $\Delta\rho = |\rho_1 - \rho_2|$ is the absolute value of the density difference between the fluids; g is gravity; $H_0$ is the meniscus height, and Y is the vertical coordinate.

Equating equations 1 and 2, supra, results in the following equation:

$$\gamma \frac{d\theta}{dS} = \Delta\rho g(H_0 - Y) \qquad \text{Equation 3}$$

at any point, S, on the meniscus. Equation 3 can be solved analytically for the X and Y coordinates of each point on the meniscus:

$$X = \sqrt{\frac{\gamma}{\Delta\rho g}} \left\{ \ln\left[\frac{\tan(\beta_0/2)}{\tan(\beta/2)}\right] + 2(\cos\beta_0 + \cos\beta) \right\} \qquad \text{Equation 4}$$

$$Y = \sqrt{\frac{\gamma}{\Delta\rho g}} \{2(\sin\beta_0 - \sin\beta)\} \qquad \text{Equation 5}$$

wherein:

$\beta = \pi/4 - \theta/2$, $\theta_0 \leq \theta \leq \pi/2$, and $\beta_0 = \pi/4 - \theta_0/2$.

In view of the foregoing, it can be appreciated that the curvature of the meniscus is a function of the interfacial surface tension, the relative weight density of the fluids, and the contact angle, $\theta_0$. In general, surface tension increases faster than density as temperature is lowered, allowing a larger meniscus to be formed at lower temperatures. As such, at a given temperature, the selection of the density of an immiscible upper fluid, and thus $\Delta\rho$, also allows the size of the meniscus to be modified. Further, by varying the height, shape, or surface roughness of the solid, the contact angle can be changed, resulting in a different curvature of the meniscus. The contact angle can also be modified through evaporation of the liquid or prior wetting of the solid object. While three-dimensional shapes have two principal radii of curvature, it is understood that the same parameters control the meniscus shape of a three-dimensional structure as in the one-dimensional case.

As hereinafter described, a variety of curved, three-dimensional microstructures may be formed utilizing the method of the present invention. Referring to FIGS. 1 and 2, in operation, polymerizable material 12 is deposited on compliant, upper surface 25 of a polydimethylsiloxane (PDMS) member 26. PDMS member 26 may be supported by a glass platform or the like. The glass platform and PDMS member 26 are transparent so as to allow a polymerizing agent such as ultraviolet light to pass therethrough. Barrier 28 extends from upper surface 25 of PDMS member 26 to retain polymerizable material 12 at a desired location on PDMS member 26 prior to polymerization. It is contemplated that polymerizable material 12 take the form of a UV-curable adhesive such as Norland Optical Adhesive No. 61. Alternatively, other polymerizable materials such as a mixture of isobornyl acrylate (IBA), tetraethyleneglycol dimethacrylate (TeEGDMA), and Irgacure 651 may be used without deviating from the scope of the present invention.

Figure 4:
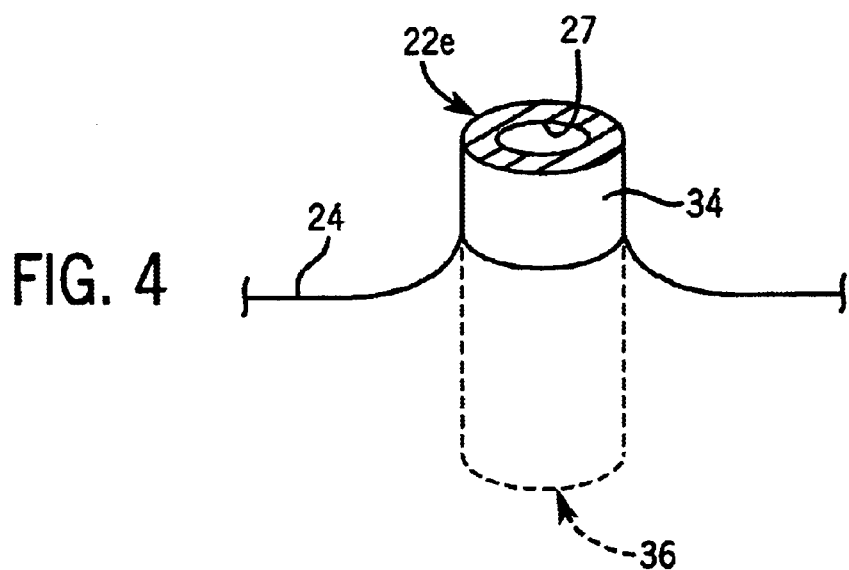
FIG. 4 is an enlarged, sectional view taken along line 4—4 of FIG. 2.
Figure 5:
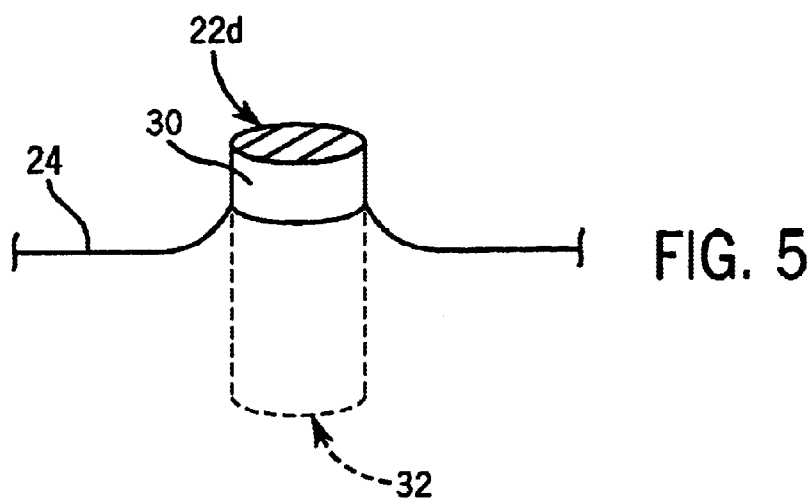
FIG. 5 is an enlarged, sectional view taken along line 5—5 of FIG. 2.

With polymerizable material 12 deposited on upper surface 25 of PDMS member 26, xyz manipulator 14 positions legs 22a–22e of solid object 16 with respect to the polymerizable material 12. Referring to FIGS. 4 and 5, legs 22d and 22e of solid object 16 are formed from a hydrophilic material. By way of example, leg 22e is tubular and includes a generally cylindrical outer surface 34 and a terminal end 36 having an aperture therein. The aperture in terminal end 36 of leg 22e communicates with passageway 27 through leg 22e. Leg 22d is generally cylindrical and includes an outer surface 30 and a terminal end 32. Legs 22d and 22e are moved by xyz manipulator 14 into contact with interface 24 of polymerizable material 12 and a gas such as ambient air. Thereafter, solid object 14 is drawn away from polymerizable material 12 to a predetermined position such that interface 24 of polymerizable material 12 and the ambient air adjacent legs 22d and 22e forms "molded" menisci corresponding to the shapes of legs 22d and 22e.

As best seen in FIG. 2, leg 22e may be of sufficient length to engage and deform the compliant, upper surface 25 of PDMS member 26 so as to create a depression 31 therein. Depression 31 in compliant surface 25 of PDMS member 26 acts as a mold to govern the shape of lower surface 29 of the polymerizable material 12 received therein, for reasons hereinafter described.

Figure 6:
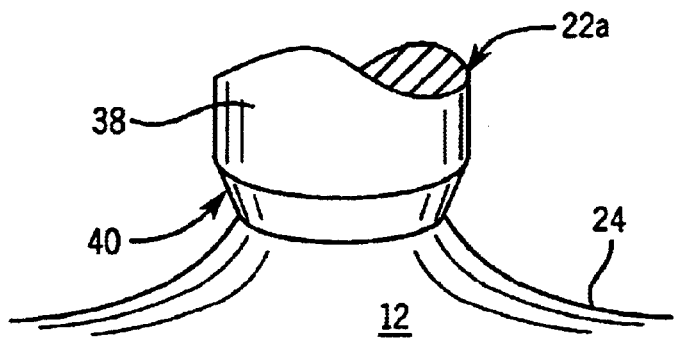
FIG. 6 is an enlarged, sectional view taken along line 6—6 of FIG. 2.
Figure 7:
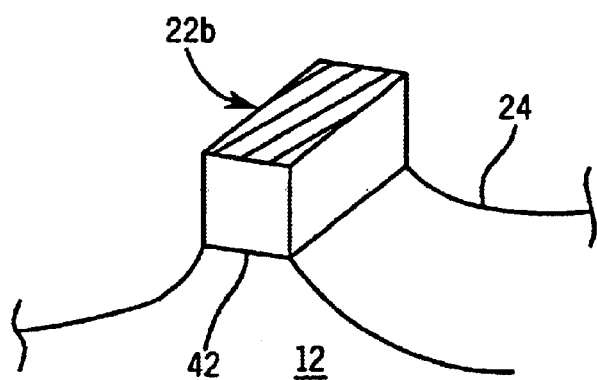
FIG. 7 is a cross section of view taken along line 7—7 of FIG. 2.

Referring to FIGS. 6 and 7, legs 22a and 22b of solid object 16 are formed from a hydrophilic material. By way of example, leg 22a has a generally cylindrical outer surface 38 and a convex terminal end 40. Leg 22b has a generally rectangular cross section and a flat terminal end 42. Referring to FIGS. 6–7, legs 22a and 22b of solid object 16 are moved by xyz manipulator 14 towards interface 24 of polymerizable material 12 and the ambient air such that terminal ends 40 and 42 of legs 22a and 22b, respectively, engage interface 24. Legs 22a and 22b are drawn away from interface 24 by xyz manipulator 14 to a predetermined position and maintained at such position. As heretofore described, the drawing of legs 22a and 22b away from interface 24 results in the interface 24 adjacent legs 22a and 22b assuming the shapes of "drawn" menisci.

Referring back to FIG. 2, leg 22c may be formed from a hydrophobic material. As leg 22c of solid object 16 is brought into contact with interface 24 by xyz manipulator 14, interface 24 of polymerizable material 12 and the ambient air forms a "molded" meniscus corresponding to the shape of leg 22c. Leg 22c is maintained at such position so as to maintain the shape of the meniscus adjacent leg 22c.

With legs 22a–22e maintained at predetermined positions, source 20 directs ultraviolet light towards PDMS member 26, and hence polymerizable material 12, such that the polymerizable material 12 polymerizes and solidifies. It can be appreciated that interface 24 of polymerized material 12 and the ambient air has a plurality of menisci corresponding to the shapes of the interface 24 prior to solidification. These polymerized menisci define corresponding three-dimensional microstructures.

Figure 6A:
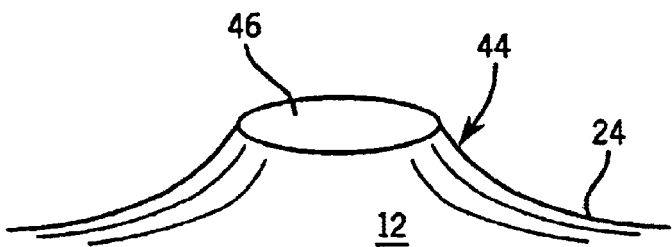
FIG. 6a is an enlarged, isometric view of a first microstructure formed utilizing the method of present invention.
Figure 7A:
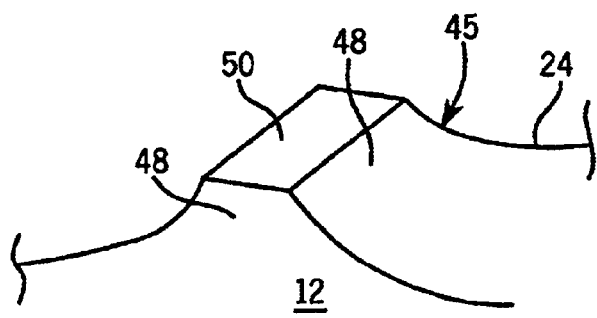
FIG. 7a is an enlarged, isometric view showing a second microstructure formed utilizing the method of the present invention.

Although the solidification of polymerizable material 12 will cause the legs 22a–22e of solid object 16 to adhere to the polymerized material 12, removal of legs 22a–22e is possible through various schemes. By way of example, the solidification could be partially completed, the corresponding legs 22a–22e removed, and the solidification completed. Alternatively, legs 22a and 22b of solid object 16 could be constructed from a sacrificial material that could be dissolved after the solidification. Referring to FIG. 6a, leg 22a may be dissolved to form a volcano-shaped microstructure 44 having a cone-shaped interior 46 corresponding to the convex terminal end 40 of leg 22a. Referring to FIG. 7a, leg 22b may be dissolved to form a wall-shaped microstructure 45 having curved-sidewalls 48 and a generally flat upper surface 50 corresponding to the flat terminal end 42 of leg 22b.

In a still further alternative, legs 22d and 22e of solid object 16 could become part of the completed device, FIGS. 4 and 5. By way of example, in such circumstances when leg 22e deforms the upper surface of PDMS member 26, lower surface 29 of polymerized material 12 conforms perfectly to the depression 31 in upper surface 25 of PDMS member 26 since PDMS member 26 is unaffected by the characteristics of polymerizable material 12. Hence, polymerized material 12 may be removed from the PDMS member 26. With polymerized material 12 removed from PDMS member 26, lower surface 29 of polymerized material 12 will include the aperture in terminal end 36 of leg 22e that communicates with corresponding passageway 27 through leg 22e. It can be appreciated that passageway 27 though leg 22e, and hence through polymerized material 12, may be used to allow fluid to be pumped therethrough. Alternatively, passageway 27 through leg 22e, and hence through polymerized material 12, may be used to establish electrical, fluidic and pneumatic connections in a microfluidic device.

In a still further alternative, legs 22d and 22e of solid object 16 could be removed from material 12 during or after polymerization to provide passages through polymerized material 12. These passages may be used to allow fluid to pumped through polymerized material 12 or to establish electrical, fluidic and pneumatic connections in a microfluidic device.

In order to modify the shape of the menisci in polymerized material 12, it is contemplated to vary the temperature at which polymerizable material 12 is polymerized. In order to show the effects of varying the temperature of polymerizable material 12 prior to polymerization, the method of the present invention was conducted at two set temperatures, namely, at room temperature (25° C.) and at a refrigeration temperature (7° C.). The theoretical heights of the menisci of interface 25 of polymerizable material 12 prior to polymerization were calculated from known values of surface tension and density and measurements of the contact angle. For a fixed value of contact angle, the menisci height should decrease 2.5% upon the lowering of the temperature from 25° C. to 7° C. Actual measurements of the contact angles were measured as 54.2° at 7° C. and 46.8° at 25° C. Given the difference in actual contact angles, it was calculated that the difference in the heights of the menisci prior to polymerization of polymerizable material 12 would be 16.5%. Taken together, it would be expected that the heights of the menisci would decrease 14.4% during polymerization for the given temperature change. However, it was found that the menisci polymerized at 7° C. were 23% smaller than the ones polymerized at 25° C. Also, the polymerized menisci were 15.5% smaller than their liquid counterparts at 7° C., compared to a 6.4% difference at 25° C.

In view of the foregoing, it is contemplated that the larger than expected percent change in height and the variation in shrinkage is due to a slower rate of polymerization at lower temperatures. Since polymerization proceeds at a slower rate at 7° C., the partially polymerized material 12 has the capacity to rearrange itself, thereby producing a smaller than expected meniscus. The faster rate of polymerization at 25° C. retards rearrangement of the polymerizable material 12 thereby resulting in a polymerized meniscus that more closely matches the pre-polymerization meniscus of polymerizable material 12.

Further, given the percentage change of height was greater than calculated, it can be appreciated that the various environmental parameters can also effect changes in structural shape of the menisci. By way of example, if polymerizable material 12 is allowed to evaporate for one hour prior to solidification, the meniscus of polymerized material 12 at 7° C. is taller than the meniscus of polymerized material 12 at 25° C. Therefore, for a given polymerizable material, various parameters such the temperature at which polymerization takes place, the hydrophobicity of the object (e.g.

legs 22a–22e) engaging the interface 24 of polymerizable material 12 and the ambient air, the structural characteristics of the object (e.g. legs 22a–22e), the surface tension, and the density difference across the interface 24 influence the shape of a meniscus of polymerizable material 12. Hence, it is contemplated to select a variety of combinations of such parameters to control the final shape of the polymerized structure.

Microscale structures with smooth, curved sidewalls have a number of potential advantages over prior microstructures. Utilizing the method of the present invention, an entire array of microstructures may be simultaneously fabricated at lower cost than traditional microfabrication techniques. Further, curved microstructures have different stress distributions upon mechanical loading than orthogonal structures. As such, microstructures formed in accordance with the present invention are more resistant to shear and buckling. In addition, microstructures having curved sidewalls allow for different flow patterns through channels of a microfluidic device as compared to orthogonal geometries. As a result, microfluidic devices providing more efficient mixing designs and more lifelike environments for biological studies are contemplated.

Further, it can be appreciated that lower surface 29 of polymerized material 12 conforms perfectly to upper surface 25 of PDMS member 26. Hence, polymerized material 12 may be removed from the PDMS member 26 and used to form a PDMS mold. The PDMS mold may be used to fabricate a plurality of microfluidic devices having lower surfaces identical in structure to lower surface 29 of polymerized material 12, heretofore described.

It can also be appreciated that interface 24 may be manipulated by other means in addition to legs 22a–22e of solid object 16 without deviating from the scope of the present invention. By way of example, interface 24 may be engaged by an air stream, alternate fluid or the like such that a non-orthogonal shape is formed in interface 24 of polymerizable material 12. Thereafter, polymerizable material 12 may be polymerized to form a microstructure as heretofore described.

Various modes of carrying out the invention are contemplated as being within the scope of the following claims particularly pointing out and distinctly claiming the subject matter, which is regarded as the invention.

We claim:

1. A method of fabricating a microstructure, comprising the steps of:
   providing a layer of polymerizable material having an outer surface;
   providing a solid object having an outer surface;
   bringing the solid object into partial contact with the layer of polymerizable material such that the layer is formed with a user desired configuration wherein a portion of the outer surface of the layer is spaced from the outer surface of the solid object, and
   polymerizing the layer of polymerizable material such that the layer solidifies.

2. The method of claim 1 comprising the additional step of disengaging the solid object from the layer after the layer is polymerized.

3. The method of claim 1 comprising the additional step of moving the solid abject with respect to the layer during the step of polymerizing the layer.

4. The method of claim 1 further comprising the additional steps of depositing the layer of polymerizable material on a base layer and deforming the base layer with the solid object prior to solidifying the polymerizable material.

5. A method of forming a microstructure, comprising the steps of:
   providing a layer of polymerizable material having an upper surface forming an interface with a fluid, the upper surface having a shape;
   engaging the interface of the upper surface with a solid object so as to manipulate the shape of the upper surface to a user desired configuration dependent upon physical properties of the upper surface and the fluid; and
   polymerizing the layer such that the interface retains a polymerized configuration that corresponds to the user desired configuration.

6. The method of claim 5 comprising the additional step of disengaging the solid object from the layer after the layer is polymerized.

7. The method of claim 5 comprising the additional step of moving the solid object with respect to the layer during the step of polymerizing the layer.

8. The method of claim 5 comprising the additional step of moving at least a portion of the solid object into the layer prior to the step of polymerizing the layer.

9. The method of claim 8 comprising the additional step of moving the portion of the solid object in the layer towards the upper surface prior to the step of polymerizing the layer.

10. A method of forming a microstructure, comprising the steps of:
    depositing a polymerizable material on a base layer, the polymerizable material having an interface with a fluid;
    manipulating the interface to a user desired shape; and
    solidifying the polymerizable material such that the interface retains a shape corresponding to the user desired shape.

11. The method of claim 10 wherein the step of manipulating the interface includes the step of engaging the interface with a solid object.

12. The method of claim 10 wherein the step of manipulating the interface including the steps:
    moving the solid object into contact with the interface;
    drawing the solid object away from the base layer; and
    maintaining the solid object at a predetermined position.

13. The method of claim 10 comprising the additional step of deforming the base layer with the solid object prior to solidifying the polymerizable material.

14. The method of claim 10 wherein the step of solidifying the polymerizable material includes the additional steps of:
    generating a polymerizing agent; and
    directing the polymerizing agent towards the polymerizable material.

15. A method of fabricating a microstructure, comprising the steps of:
    providing a layer of polymerizable material;
    bringing a solid object into contact with the layer of polymerizable material;
    polymerizing the layer of polymerizable material such that the layer solidifies; and
    dissolving the solid from the layer after the layer is polymerized.

16. A method of fabricating a microstructure, comprising the steps of:
    providing a layer of polymerizable material;
    bringing a hydrophilic solid object into contact with the layer of polymerizable material; and polymerizing the layer of polymerizable material such that the layer solidifies.

17. A method of fabricating a microstructure, comprising the steps of:

providing a layer of polymerizable material;

bringing a hydrophobic solid object into contact with the layer of polymerizable material;

polymerizing the layer of polymerizable material such that the layer solidifies.

18. A method of fabricating a microstructure, comprising the steps of:

providing a layer of polymerizable material, the layer being positioned in a gas such that the layer and the gas intersect at an interface;

bringing a solid object into contact with the layer of polymerizable material such that the interface has a generally curved shape adjacent the solid object; and polymerizing the layer of polymerizable material such that the layer solidifies.

19. The method of claim 18 comprising the additional step of moving the solid object into the layer of polymerizable material prior to the step of polymerizing the layer.

20. The method of claim 18 comprising the additional step of moving the solid object away from the layer of polymerizable material prior to the step of polymerizing the layer so as to form the curved shape of the interface.

21. A method of forming a microstructure, comprising the steps of:

providing a layer of polymerizable material having an upper surface; the upper surface having a shape;

engaging the upper surface with a portion of a solid object so as to alter the shape of the upper surface;

polymerizing the layer such that the layer is polymerized; and dissolving the portion of the solid object engaging the upper surface after the layer is polymerized.

* * * * *

UNITED STATES PATENT AND TRADEMARK OFFICE
CERTIFICATE OF CORRECTION

PATENT NO. : 6,821,475 B2
DATED : November 23, 2004
INVENTOR(S) : Beebe et al.

It is certified that error appears in the above-identified patent and that said Letters Patent is hereby corrected as shown below:

Column 1,
Line 3, insert the following:

-- REFERENCE TO GOVERNMENT GRANT

This invention was made with United States government support awarded by the following agencies: DOD ARPA F33615-98-1-2853. The United States has certain rights in this invention. --

Signed and Sealed this

Twenty-second Day of February, 2005

JON W. DUDAS
*Director of the United States Patent and Trademark Office*